Figure 1:
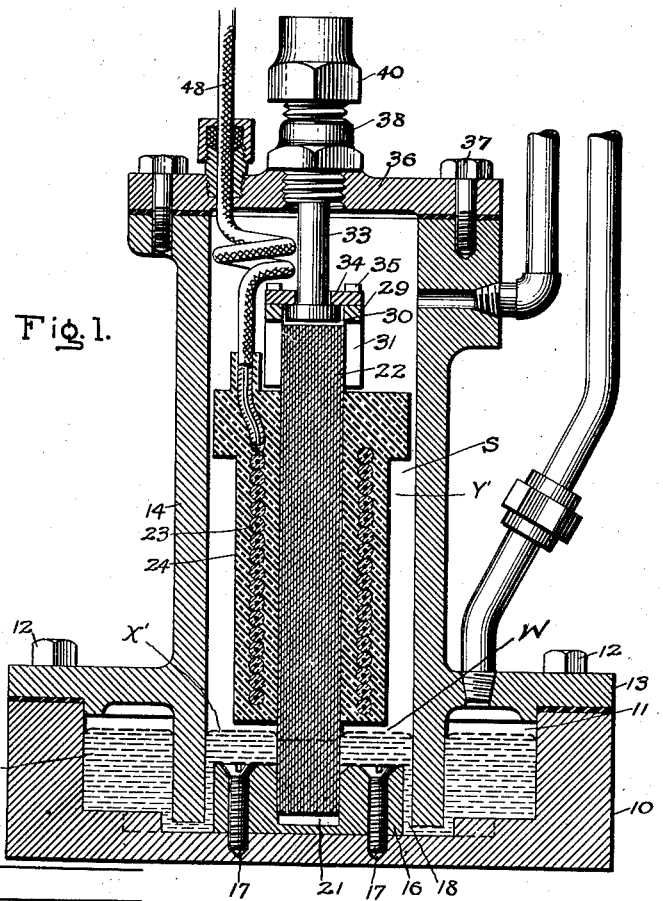

Nov. 10, 1925.  1,560,951
L. W. THOMPSON ET AL
FLOW METER AND THE LIKE
Filed April 17, 1923  3 Sheets-Sheet 1

Inventors:
Louis W. Thompson,
Jacob W. McNairy,
by
Their Attorney.

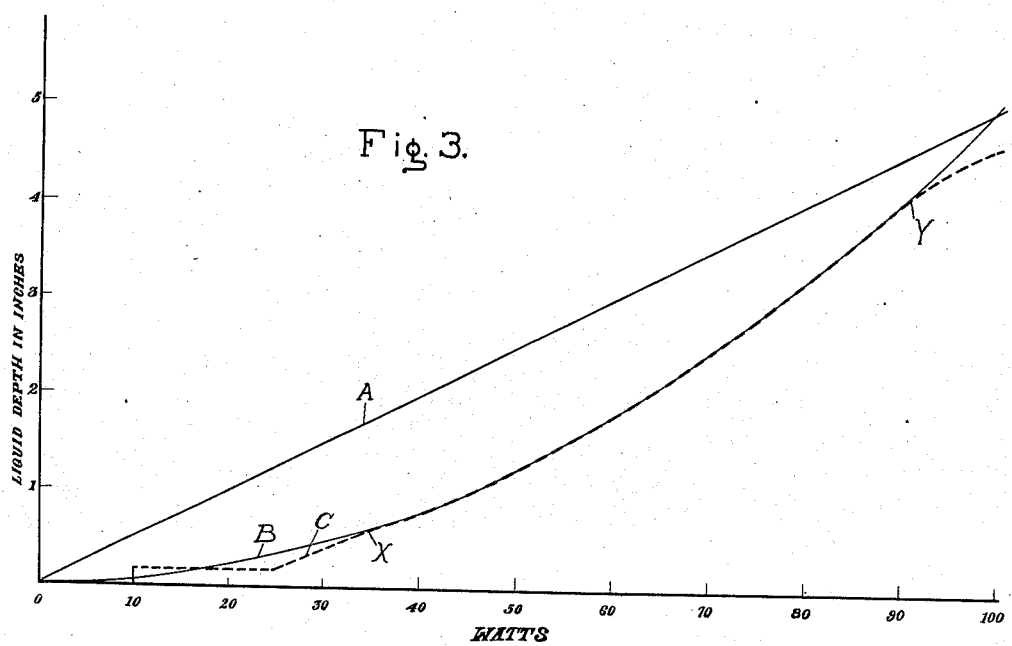

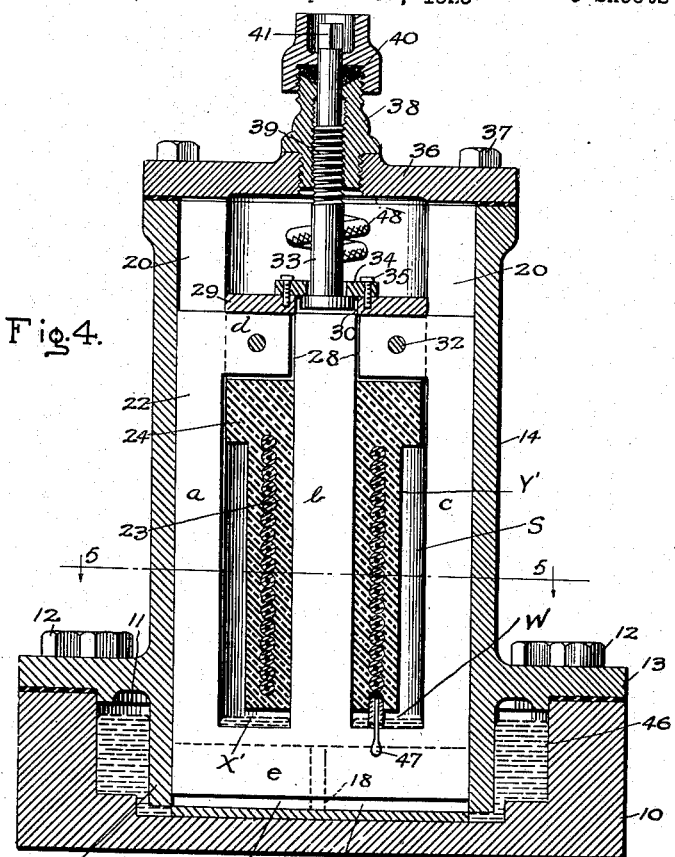
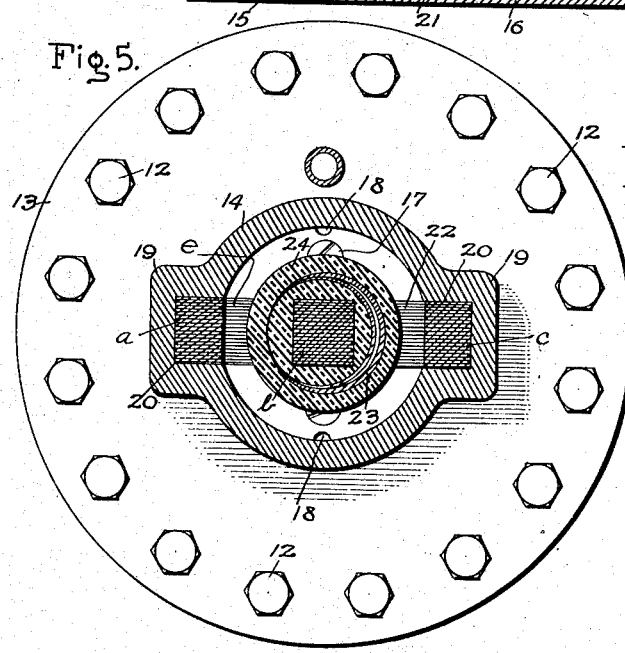
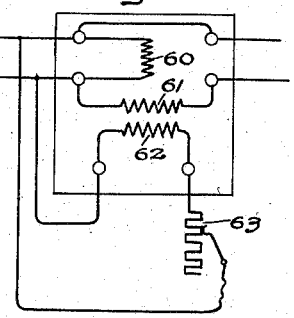

Patented Nov. 10, 1925.

1,560,951

UNITED STATES PATENT OFFICE.

LOUIS W. THOMPSON AND JACOB W. McNAIRY, OF SCHENECTADY, NEW YORK, ASSIGNORS TO GENERAL ELECTRIC COMPANY, A CORPORATION OF NEW YORK.

FLOW METER AND THE LIKE.

Application filed April 17, 1923. Serial No. 632,759.

*To all whom it may concern:*

Be it known that we, LOUIS W. THOMPSON and JACOB W. McNAIRY, citizens of the United States, residing at Schenectady, in the county of Schenectady, State of New York, have invented certain new and useful Improvements in Flow Meters and the like, of which the following is a specification.

The present invention relates to flow meters for measuring the flow of fluids through conduits.

As is well known, the ordinary flow meter comprises: (a) a pressure difference-creating device which is placed in the conduit through which the fluid to be metered flows and creates a pressure difference proportional to the square of the flow; (b) a pressure responsive instrument of the U-tube type containing an indicating liquid such as mercury and to which the pressure difference is applied to effect deflections of the indicating liquid in the U-tube proportional thereto, and (c) some means for indicating, indicating and recording, or indicating, recording and integrating the amount of the liquid deflections either directly in terms of flow or in terms which may be converted into terms of flow. Our invention relates to flow meters of this type wherein the deflections of the indicating liquid are utilized to effect a flow of electric current proportional to the flow of the fluid being metered, such current being measured to give a measure of the fluid flow. These are usually termed electric flow meters.

It will be understood that we use the term U-tube in its broad sense and by such term we mean pressure-responsive devices comprising a leading leg and a trailing leg connected at their lower ends and adapted to contain an indicating liquid, the liquid when lowering in one leg rising in the other. Such devices are not necessarily in the form of a U but may as in the present instance, comprise two concentric tubes connected at their lower ends.

The object of our invention is to provide an improved electric flow meter which is simple in structure, accurate, reliable in operation and easy to manufacture and calibrate.

In meters of this type, if the fluid flow is to be integrated it is necessary that the flow of current produced in the indicating circuit by the deflections of the indicating liquid be proportional to the square root of the deflections since such deflections are proportional to the square of the fluid flow, and a further object of the invention is to provide an electric meter wherein this condition is met in a very simple and satisfactory manner.

For a consideration of what we believe to be novel and our invention, attention is directed to the accompanying description and the claims appended thereto.

Figure 2:
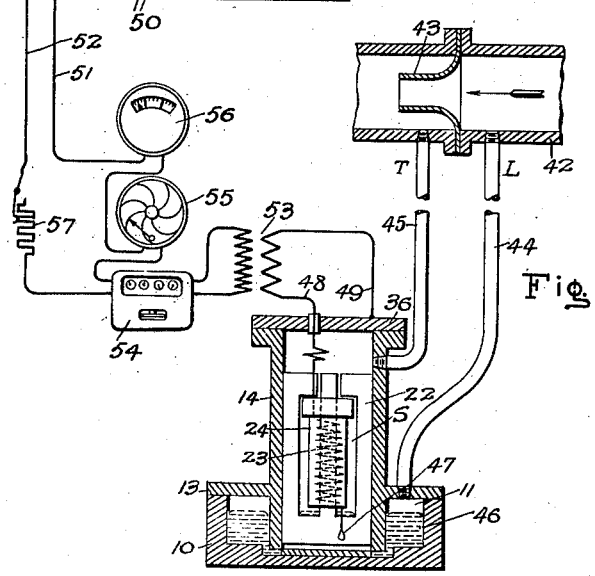

In the drawing, Fig. 1 is a sectional view of the pressure-responsive device of the flow meter embodying our invention; Fig. 2 is a diagrammatic view showing the connections for the meter; Fig. 3 is a diagram illustrating certain points in connection with the operation of the meter; Fig. 4 is a sectional view taken at a right angle to that of Fig. 1; Fig. 5 is a transverse sectional view taken on line 5—5, Fig. 4, and Fig. 6 is a diagram of connections of the integrating watt hour meter.

According to the preferred form of our invention, we provide in a flow meter an indicating instrument of the nature of an electrical transformer wherein the primary comprises a winding located in the trailing leg of the U-tube and the secondary comprises an indicating liquid, such as mercury, which is a conductor of electricity and which in rising in the trailing leg of the U-tube provides an annular ring or loop of liquid surrounding the primary winding. The liquid ring or loop thus forms a closed secondary having a single turn which varies in cross section as the liquid rises and falls in the trailing leg of the U-tube. An indicating circuit including a source of alternating potential is connected to the primary winding and, as is pointed out fully hereinafter, we are enabled by our invention to create a flow of current in such circuit which varies directly with the flow of fluid being metered, i. e., directly with the square root of the pressure difference created by the pressure difference creating device. This current is then measured to give a measure of the fluid flow and may be integrated to give the total flow. For integrating it is preferable to integrate in terms of watts as a watt hour meter is a more satisfactory form of instrument.

Referring to the drawing, 10 indicates a base which may be circular and made of metal or other suitable material. Formed in base 10 is a well or chamber 11 which forms one leg of a U-tube. Fixed on base 10 by a ring of bolts 12 is a cover plate 13 from which projects a tube 14 which forms the other leg of the U-tube. Tube 14 projects below cover plate 13 to a point adjacent the bottom wall of well 11 as is indicated at 15. In the lower end of tube 14 is a block 16 fastened by screws 17 to the bottom wall of well 11. Block 16 has a contour the same as that of the interior of tube 14 so it entirely fills the lower end of the tube and at one or more points on its periphery it is provided with grooves 18 (two being shown in the present instance) through which well 11 is connected to the tube 14 above block 16. In other words, the two legs of the U-tube i. e., well 11 and tube 14, are connected to each other by the groove or grooves 18. This serves to decrease the amount of operating liquid, for example mercury, required for the instrument.

Tube 14 is provided with two longitudinally extending opposed ridges 19 in which are rectangular grooves 20 opening into tube 14, and in block 16 is a transverse groove 21 which at its ends opens into grooves 20. Mounted in grooves 20 is a transformer core 22 comprising three legs $a$, $b$ and $c$ connected by top and bottom pieces $d$ and $e$. The outside legs $a$ and $c$ have a sliding fit in grooves 20 and bottom piece $e$ has a sliding fit in groove 21 so the core 22 of the transformer can be raised and lowered in tube 14. Surrounding the middle leg $b$ of the transformer core 22 is a primary winding 23 enclosed in a casing of insulating material 24 which may be formed of any suitable insulating material such as hard rubber, such material being molded directly around the coil.

The core 22 is a laminated structure and to permit of assembling the unit comprising the primary winding 23 and its casing on the middle leg of the core, each lamina at one end has the outside legs $a$ and $c$ cut loose from the central leg $b$ as indicated at 28. The outside legs of each lamina can then be bent to one side to permit of the middle leg being slipped through the central opening of casing 24. The legs $b$ of successive laminæ are slipped into the opening from opposite ends so that cuts 28 occur first at one end and then at the other so as not to appreciably affect the permeance of the magnetic circuit of the core.

Extending across the top of core 21 is a flat plate 29 provided with a central opening 30 and pairs of depending wings 31 at its two ends which clamp the sides of core 22 and are fastened thereto by suitable bolts or rivets. Opening 30 receives the head of an adjusting screw 33 which is held in the opening by a plate 34 fixed to plate 29 by bolts 35 and provided with an opening through which screw 33 projects. The upper end of tube 14 is closed by a cover plate 36 fastened in place by a ring of bolts 37. At the center of cover plate 36 is a bushing 38 having a threaded portion with which threads 39 on adjusting screw 33 engage. The outer end of screw 33 projects out through a stuffing box 40 and has a squared end 41 to receive a key for turning the screw. By turning screw 33 core 22 and the primary winding can be raised and lowered as a unit in tube 14, the head of the adjusting screw turning in opening 30 relatively to the core. With the above described arrangement it will be seen that there is provided an annular chamber S between the outer surface of casing 24 and the inner wall of tube 14 which annular chamber forms the trailing leg of the U-tube.

In Fig. 2, 42 indicates a conduit through which the fluid to be metered flows and in which is a pressure difference creating device 43 which creates a pressure difference which bears a definite relation to the rate of flow. Any suitable form of pressure difference creating device may be used, a known form usually termed a flow nozzle being illustrated in the present instance. A Pitot tube, Venturi tube or the like may be used, however, if preferred. The leading pressure side of pressure difference creating device 43 is connected to well 11 by a conduit 44 and the trailing pressure side is connected to leg 14 by conduit 45. In the U-tube is a quantity of indicating liquid, 46, preferably mercury, and, as is well understood, at no flow in conduit 42 this liquid will stand at the same level in the two legs of the U-tube while when flow takes place in conduit 42, the pressure difference created by device 43 being applied to the two legs of the U-tube will cause the level of the liquid in well 11 to lower and that in leg 14 to rise, the amount of deflection being a function of the flow in conduit 42.

One terminal of primary winding 23 is grounded on the frame of the meter casing as is indicated at 47 and the other terminal is connected by a lead wire 48 to one side of the indicating circuit, the other side of the indicating circuit being grounded on the meter casing as indicated at 49. The indicating circuit is connected to a source of alternating current of constant potential indicated at 50, the lead wires being indicated at 51 and 52. Where this source is of the ordinary potential usually met with, we preferably employ in the indicating circuit a step down transformer 53 so that the voltage applied to the primary winding 23 will be of a low value. For example, we have found a voltage of the order of five volts satisfactory. In the indicating circuit is a watt hour meter 54, a curve drawing ammeter 55 and an indicating ammeter 56. These indicating instruments may be placed on either the high voltage or low voltage side of transformer 53 but are preferably placed on the high voltage side since standard instruments for such higher voltage are obtained more readily. In the indicating circuit is a resistance 57.

As stated above, the liquid ring or loop in leg 14 surrounding primary winding 23 forms a closed secondary and as this liquid ring rises and falls in leg 14 due to changes in flow through conduit 42 it varies the flow of current in the primary winding, and we have found that by choosing a certain definite resistance for the primary circuit, a certain flux density in the magnetic circuit of the transformer comprising legs $a$, $b$ and $c$, and a certain variable cross sectional area of the liquid ring which forms the closed secondary that for a given range the total watt consumption will bear a direct straight line relation to the square root of the liquid deflection. In other words, the watt consumption will be directly proportional to the flow of fluid being metered. The number of variables present makes the action somewhat complex, and it can be best understood by a consideration of the diagram shown in Fig. 3 wherein watts consumed in the primary circuit are plotted against depth of the liquid ring or loop measured in a vertical direction. If it be assumed that the primary circuit has no resistance so the watt loss in it is zero, and that there is no flux leakage in the transformer so the losses in it are zero also, then the total watt consumption will be that consumed in the liquid ring and will vary inversely with the resistance of the liquid ring. The resistance of the liquid depends on its cross sectional area and mean length and assuming a vertical space S of uniform cross section and fixed mean length, the resistance of the closed secondary winding formed by the liquid loop will be a direct function of depth of the liquid ring or loop, i. e., the height of liquid in the space. It follows, therefore, that under these conditions, the watt consumption will be a direct function of the depth of the liquid ring or loop in the liquid space. This condition is indicated by the line A in Fig. 3.

The straight line relation just described may be departed from in three ways, viz:

(1) By shaping liquid space S so it is no longer uniform in cross section or of fixed mean length;

(2) By introducing resistance into the primary circuit which introduces a watt loss proportional to the current drawn.

(3) By introducing leakage of flux into the magnetic circuit of the transformer thereby increasing the reactance of the transformer.

In Fig. 3, the curve B is a square root curve obtained by plotting watts against depth of the liquid ring or loop, that is a curve wherein each abscissa value has the same proportional relation to the square root of the ordinate value, and we have found that by suitably shaping chamber S, introducing a suitable amount of resistance into the primary circuit and providing for a suitable flux leakage in the transformer, that we can modify line A to produce a curve C which coincides with curve B over a considerable range. A liquid deflection corresponding to the portion of curve C which coincides with curve B is thus available for use in measuring fluid flow in a conduit by means of a pressure difference creating device which creates a pressure difference proportional to the square of the flow.

The shape of chamber S, the amount of resistance in the primary circuit, and the proper flux density (this latter being the principal factor which determines the leakage of flux in the transformer) required to produce the above result can be determined fairly accurately by calculation but the calculations are involved so that it is preferable to determine experimentally the required arrangement and relative values to be used in any particular case.

It is desirable to shape the liquid chamber as little as possible as this involves difficulties from a manufacturing standpoint, so preferably we choose a resistance for the primary circuit and a flux density for the transformer circuit such that the curve produced will be as nearly a square root curve as possible and then shape the chamber S to modify such curve to a square root curve over the desired range. We have found that by choosing a suitable resistance for the primary circuit and a suitable flux density for the transformer core that curve C may be made a square root curve except for its lowermost values. This means that the chamber S need be specially shaped only at its lower end and we have found that this shaping requires only a short section of greater cross sectional area.

To determine the required primary circuit resistance and flux density we preferably proceed as follows: We first choose the amount of liquid deflection desired and then provide a transformer frame having a central leg somewhat longer than this amount of deflection. It will be understood that the liquid deflection here referred to is not the total liquid deflection which occurs in the U-tube but is that portion of it which occurs in the leg formed by tube 14, i. e., the trailing leg. This of course, is proportional to the total deflection. If desired, calculations may be made in terms of total deflection. For example, for most commercial uses a liquid deflection of four inches or five inches is satisfactory and for this amount of deflection, the middle transformer leg may be of the order of six or seven inches long, it being desirable that it be sufficiently long so as not to diminish the leakage path too much at maximum deflection. That is to say, at maximum deflection it is desirable that the liquid should not rise too near the top of the central leg. We then choose a primary winding for the transformer and a voltage such as to give an average flux density of the order of 60,000 to 70,000 lines of force per square inch, and put in circuit with it a resistance of such value as to limit the watt consumption to an amount sufficient to operate the instruments in the circuit in a satisfactory manner, it being desirable to maintain the watt consumption at as low a value as possible in order to keep the cost of operation at a minimum. The instrument is then connected up and operated and a curve plotted between watts consumed and depth of liquid loop or ring. If it is found that this curve rises too fast, that is, that the watt consumption does not increase fast enough to be proportional to the square root of the liquid depth, it can be modified in the proper direction by lowering the transformer density. This may be done either by lowering the voltage on the primary or decreasing the number of turns in the primary winding. On the other hand, if the curve does not rise fast enough then it may be made to rise faster by increasing the transformer density in either of the ways just referred to. By this method of procedure we have found that curve C can be made to conform to curve B, i. e., a square root curve, throughout a considerable range. This range can be increased at the upper limit by varying the external resistance 57 and having found the required transformer density we then vary resistance 57 to bring the upper end of curve C onto square root curve B to the desired extent. We have found that varying resistance 57 while it modifies the upper end of curve C affects practically not at all the central and lower portion. By the foregoing procedure, we are enabled to provide a structure wherein with a chamber S of uniform cross section, the watt consumption will be proportional to the square root of the depth of the liquid ring over a range sufficiently great to make it practical for use in a flow meter. However, it is desirable to increase the range at the lower end of curve C in order to make the watt consumption at zero flow as little as possible and thereby decrease the cost of operating the flow meter, and we accomplish this by shaping the lower end of chamber S so that at first the cross sectional area of the liquid ring increases very rapidly. This may be done by increasing the radial width of chamber S at its lower end so it has a width as indicated at $w$ in Figs. 1 and 4. As will be noted, this is accomplished in the present instance in a very simple manner by making casing 24 terminate short of the top of transformer cross piece $c$. This is of importance from a manufacturing point of view since by such arrangement the leg 14 of the U-tube containing the transformer becomes a plain cylinder as does also casing 24. It will be understood, of course, that curve C can be modified at any point throughout its length by shaping chamber S and that this may be done where found necessary in any particular instance.

Referring to curve C, when the primary circuit is open and the liquid ring or loop is broken so that its depth is zero, there will be no current flow or watt consumption in the primary circuit. As soon as the primary circuit is closed there will be immediately a certain watt consumption due to the transformer losses so that curve C first follows along the base line to, for example, 10 watts. Now, as soon as the liquid ring or loop is established the watt consumption will increase very rapidly for an instant, and curve C will come into coincidence with the square root curve B as some point X, which may represent 35 watts for example. Curve C then follows curve B to some point Y, after which it begins to depart from it. The length of curve between the points X and Y is available therefore, for use in measuring the fluid flow in accordance with the square root law. This means of course that the zero of the flow meter is arranged at the point X or beyond it and that the deflection representing maximum flow is not beyond point Y. Accordingly, the flow meter casing is filled with indicating liquid 46 to a level such that a liquid ring is established in space S of such depth as to give a watt consumption represented by a point at or slightly beyond point X. Deflections of the liquid in space S will then produce flow of current in the primary circuit proportional to the square root of the deflections. In the drawing the liquid is shown as standing at zero level and as will be seen from Fig. 4, there is a liquid ring or loop around transformer leg $b$ as is indicated at X'. This corresponds approximately to point X on curve C. Point Y occurs in chamber S at about the point Y'. The distance between point X' and point Y' may with advantage be of the order of four inches, this amount of deflection being satisfactory for most commercial applications. It will be understood that a greater or lesser deflection range may be utilized when found desirable.

With the above described arrangement there is a certain amount of electric current flow in the primary circuit when the indicating liquid stands at the level representing zero flow of fluid, and indicating ammeter 56 and curve drawing ammeter 55 are calibrated so that under this condition they will indicate zero on their scale and chart. In other words, with this current flow taking place, they will read zero. In the case of wattmeter 54, it may be compensated in any suitable manner to prevent it from operating or rotating at zero fluid flow. For example, an opposing winding may be included in the current coil of the wattmeter and the current in this opposing winding adjusted by means of a rheostat in series with it until the wattmeter does not rotate under no fluid flow conditions, i. e., at zero deflection of the indicating liquid. A diagram of these connections is shown in Fig. 6 wherein 60 indicates the potential coil of the wattmeter, 61 the current coil, 62 the opposing winding, and 63 the adjustable rheostat.

As has been pointed out above, the watts consumed in the transformer circuits are proportional to the square root of the deflection of the indicating liquid over the specified range. However, the current measured in amperes does not follow exactly this law because of the increase of the power factor in the circuit as the load increases. However, this is easily taken care of in instruments 55 and 56 by marking or calibrating their scales so they give correct readings.

Any suitable or desired voltage may be used in connection with the transformer winding 23 but preferably we employ a low voltage of the order of five volts, for example, and utilize a primary winding made up of a single layer of turns covered with rubber insulation. The voltage between turns is thus quite small and the turns well insulated from each other so there is little likelihood of any of the turns becoming grounded or short circuited. This is of particular importance in connection with meters used to measure high pressure steam flow because in such cases the inside of the meter casing, which becomes filled with water, is subjected to the steam pressure which may sometimes cause moisture to penetrate casing 24. In the case of high voltage being used on winding 23 any such moisture would be likely to ground or short circuit some of the turns. However, with low voltage between turns and a suitable waterproof insulation such as rubber on the primary conductor 23, moisture penetrating casing 24 would have no appreciable effect on the winding.

In connection with the lower end of the curve, it is best not to bring the zero for the flow meter too far down the curve because it is desirable to have a well-defined liquid ring or loop at zero deflection. This is because mercury has a high surface tension and when the ring or loop is broken, in being formed again it builds up on each side at the top of the transformer core and then breaks across it quickly. To have a stabilized and well-defined zero, therefore, the ring or loop of liquid should be of sufficient depth at zero that it is not likely to break. In use, after the approximate amount of liquid required is in the meter casing, the correct adjustment for zero can be obtained by adjusting the transformer core vertically by means of screw 33.

While we have particularly described our invention as applied to flow meters for measuring flow of fluids through conduits, it having features of particular importance for this application and especially for use in measuring steam flow, it is to be understood that the invention is not limited to this application and that it may be used in any other places and for any other uses to which it may be found adapted. That is to say, instead of measuring the pressure difference created by a pressure difference-creating device it may be used to measure a pressure or pressure difference derived from any other source, and the measuring instruments may indicate in terms of the pressure or pressure difference or in terms of some quantity of which the pressure or pressure difference is a function. It will also be understood that it is not limited to cases wherein a square root law is to be followed since by adjustment and calibration other relations between liquid depth and current flow or watt consumption may be established.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States, is,—

1. In a flow meter, the combination of a U-tube, a pressure-difference-creating device, leading and trailing pipes connecting the pressure-difference-creating device to the U-tube, a transformer core which provides a closed magnetic circuit mounted in a leg of the U-tube, a primary winding embedded in a casing of non-magnetic material mounted in such leg of the U-tube and on said core, the outer surface of said casing defining with the adjacent inner surface of the U-tube leg an annular chamber, conducting liquid in the U-tube which is adapted to be raised and lowered in said chamber by the pressure-difference created by said pressure-difference-creating device to form a closed secondary for said transformer, a source of potential, a circuit connecting it to said primary winding, and a measuring instrument in said circuit.

2. In a flow meter, the combination of a U-tube, a pressure-difference-creating device, leading and trailing pipes connecting the pressure-difference-creating device to the U-tube, a transformer core which provides a closed magnetic circuit mounted in a leg of the U-tube, a primary winding embedded in a casing of non-magnetic material mounted in such leg of the U-tube and on said core, the outer surface of said casing defining with the adjacent inner surface of the U-tube leg an annular chamber, conducting liquid in the U-tube which is adapted to be raised and lowered in said chamber by the pressure-difference created by said pressure-difference-creating device to form a closed secondary for said transformer, a source of potential, a circuit connecting it to said primary winding, and a measuring instrument in said circuit, the flux density in the core of the transformer being such that for a certain range the watt consumption in said circuit is proportional to the square root of the deflection of the liquid.

3. In a flow meter, the combination of a U-tube, a pressure-difference-creating device, leading and trailing pipes connecting the pressure-difference-creating device to the U-tube, a transformer core which provides a closed magnetic circuit mounted in a leg of the U-tube, a primary winding embedded in a casing of non-magnetic material mounted in such leg of the U-tube and on said core, the outer surface of said casing defining with the adjacent inner surface of the U-tube leg an annular chamber, conducting liquid in the U-tube which is adapted to be raised and lowered in said chamber by the pressure-difference created by said pressure-difference-creating device to form a closed secondary for said transformer, a source of potential, a circuit connecting it to said primary winding, a measuring instrument in said circuit, the shape of said chamber, the flux density in the transformer core, and the resistance of said circuit being such that the watt consumption in said circuit is proportional to the square root of the deflection of the liquid.

4. In a flow meter, the combination of a U-tube, a pressure-difference-creating device, leading and trailing pipes connecting the pressure-difference-creating device to the U-tube, a transformer core which provides a closed magnetic circuit mounted in a leg of the U-tube, a primary winding embedded in a casing of non-magnetic material mounted in such leg of the U-tube and on said core, a surface of said casing defining with an adjacent surface an annular chamber, conducting liquid in the U-tube which is adapted to be raised and lowered in said chamber by the pressure-difference created by said pressure-difference-creating device to form a closed secondary for said transformer, said liquid forming a closed loop when the fluid flow through the conduit is zero, a source of potential, a circuit connecting it to said primary winding, and a measuring instrument in said circuit.

5. In an instrument of the character described, the combination of a U-tube, a transformer core which provides a closed magnetic circuit therein, a primary winding comprising a single layer embedded in a casing of non-magnetic material, said casing forming with an adjacent wall a chamber in the form of a loop, a conducting liquid in the U-tube adapted to enter said chamber to form a closed secondary for the transformer, and an indicating circuit including a source of potential connected to said primary winding.

6. In an instrument of the character described, the combination of a tube having a conducting liquid therein, the level of which may be raised and lowered in the tube, a transformer core which provides a closed magnetic circuit in the tube, a primary winding inside the tube on the core, said winding comprising a single layer of wire, an indicating circuit connected to the primary winding, and a source of potential in said indicating circuit.

7. In an instrument of the character described, the combination of a tube having a conducting liquid therein, the level of which may be raised and lowered in the tube, a transformer core which provides a closed magnetic circuit in the tube, a primary winding inside the tube on the core, said winding comprising a single layer of wire having waterproof insulation thereon, an indicating circuit connected to the primary winding, and a source of potential in said indicating circuit.

8. In an instrument of the character described, the combination of a tube having a conducting liquid therein, the level of which may be raised and lowered in the tube, a transformer core in the tube, said core providing a closed magnetic circuit a primary winding inside the tube on the core, said winding comprising a single layer of wire embedded in a casing which forms with the inner surface of the tube a chamber in the form of a loop in which the liquid moves, an indicating circuit connected to the primary winding, and a source of potential in said indicating circuit.

9. In an instrument of the character described, the combination of a U-tube, a transformer core which provides a closed magnetic circuit therein having a leg in spaced relation to a wall of the U-tube, conducting liquid in said tube which liquid forms a closed secondary transformer winding, a primary transformer winding on such leg inside the U-tube, and an indicating circuit including a source of potential connected to said primary winding.

10. In an instrument of the character described, the combination of a U-tube, a transformer core which provides a closed magnetic circuit therein having a leg in spaced relation to a wall of the U-tube, conducting liquid in said tube, which liquid forms a closed secondary transformer winding, a primary transformer winding on such leg inside the U-tube, a source of relatively high potential, a step-down transformer through which said source is connected to said primary winding, and measuring instruments on the high potential side of said step-down transformer.

11. In an instrument of the character described, the combination of a U-tube, a transformer core which provides a closed magnetic circuit therein, a primary winding comprising a single layer embedded in a casing of non-magnetic material, said casing forming with a wall of the U-tube a chamber in the form of a loop, a conducting liquid in the U-tube adapted to enter said chamber to form a closed secondary for the transformer, a source of potential, a step-down transformer through which said source is connected to said primary winding, and a measuring instrument on the high potential side of said transformer.

12. In an instrument of the character described, the combination of a U-tube having guides in walls thereof, a transformer core having three legs, the outside legs lying in said guides, means for adjusting said core vertically, a primary transformer winding on the middle leg of said core, an indicating circuit connected to it, and a conducting liquid in the U-tube which is adapted to form a loop around the middle leg of the transformer to provide a closed secondary for it.

13. In an instrument of the character described, the combination of a tube having a conducting liquid therein, the level of which may be raised and lowered in the tube, a transformer core in the tube, said core providing a closed magnetic circuit, a primary winding inside the tube on the core, said winding comprising turns of wire covered with a hygroscopic insulation, an indicating circuit connected to the primary winding, and a source of potential in said indicating circuit.

14. In an instrument of the character described, the combination of a tube having a conducting liquid therein, the level of which may be raised and lowered in the tube, a transformer core in the tube, said core providing a closed magnetic circuit, a primary winding inside the tube on the core, said winding comprising turns of wire having a water-proof insulation thereon, an indicating circuit connected to the primary winding, and a source of potential in said indicating circuit.

15. In a flow meter, the combination of a U-tube, a pressure-difference-creating-device, leading and trailing pipes connecting the pressure-difference-creating-device to the U-tube, a transformer core which provides a closed magnetic circuit mounted in a leg of the U-tube, a primary winding in such leg of the U-tube on said core, walls in such leg of the U-tube which define an annular chamber, conducting liquid in the U-tube which is adapted to be raised and lowered in said chamber by the pressure difference created by said pressure difference creating device to form a closed secondary for said transformer, a source of potential, a circuit connecting it to said primary winding, and a measuring instrument in said circuit.

16. In a flow meter, the combination of a U-tube, a pressure-difference-creating-device, leading and trailing pipes connecting the pressure-difference-creating-device to the U-tube, a transformer core which provides a closed magnetic circuit mounted in a leg of the U-tube, a primary winding in such leg of the U-tube on said core, walls in such leg of the U-tube which define an annular chamber, and conducting liquid in the U-tube which is adapted to be raised and lowered in said chamber by the pressure difference created by said pressure difference creating device to form a closed secondary for said transformer, the level of the liquid being such that at zero flow the liquid secondary is closed.

17. In an instrument of the character described, the combination of a tube having a conducting liquid therein, the level of which may be raised and lowered in the tube, a transformer core which provides a closed magnetic circuit in the tube, a primary winding inside the tube on the core, an indicating circuit connected to the primary winding, and a source of potential in said indicating circuit.

18. In an instrument of the character described, the combination of a tube having a conducting liquid therein, the level of which may be raised and lowered in the tube, a transformer core in the tube, said core comprising a plurality of legs and providing a closed magnetic circuit, and a primary winding surrounding one of said legs and defining with an adjacent wall a vertical liquid chamber for the conducting liquid.

In witness whereof, we have hereunto set our hands this 12th day of April, 1923.

LOUIS W. THOMPSON.
JACOB W. McNAIRY.